United States Patent
Enssle et al.

(10) Patent No.: US 7,016,335 B1
(45) Date of Patent: Mar. 21, 2006

(54) TRANSMITTING FACILITY AND RECEIVING FACILITY FOR A MULTIPOINT-TO-POINT SYNCHRONOUS CDMA NETWORK

(75) Inventors: Jürgen Enssle, Fellbach (DE); Marc Pelous, Ludwigsburg (DE)

(73) Assignee: Alcatel, Paris (FR)

( * ) Notice: Subject to any disclaimer, the term of this patent is extended or adjusted under 35 U.S.C. 154(b) by 1065 days.

(21) Appl. No.: 09/587,909

(22) Filed: Jun. 6, 2000

(30) Foreign Application Priority Data

Jun. 18, 1999 (DE) ............................... 199 28 019

(51) Int. Cl.
*H04B 7/216* (2006.01)

(52) U.S. Cl. ...................................... 370/342; 370/441

(58) Field of Classification Search ................ 370/335, 370/342, 350, 441, 503, 507, 504, 509–516
See application file for complete search history.

(56) References Cited

U.S. PATENT DOCUMENTS

| | | | | |
|---|---|---|---|---|
| 5,299,236 A | * | 3/1994 | Pandula ...................... | 375/368 |
| 5,563,883 A | * | 10/1996 | Cheng ......................... | 370/449 |
| 5,577,025 A | * | 11/1996 | Skinner et al. ............ | 370/209 |
| 5,715,521 A | * | 2/1998 | Fukasawa et al. ........... | 455/69 |
| 5,841,768 A | * | 11/1998 | Ozluturk et al. ............ | 370/335 |
| 5,914,943 A | * | 6/1999 | Higuchi et al. ............. | 370/320 |
| 6,061,359 A | * | 5/2000 | Schilling et al. ........... | 370/441 |

FOREIGN PATENT DOCUMENTS

| | | |
|---|---|---|
| EP | 0678991 A | 10/1995 |
| WO | WO 97/08861 | 3/1997 |

* cited by examiner

*Primary Examiner*—Huy D. Vu
*Assistant Examiner*—Daniel Ryman
(74) *Attorney, Agent, or Firm*—Sughrue Mion, PLLC

(57) ABSTRACT

The object of the invention is to provide an acquisition method for a multipoint-to-point CDMA network (NET) that minimizes the influence of the acquisition procedure on the information transmission. The acquisition signals are encoded in a specific acquisition code that differs from the CDMA communication code of the information signals. In addition, the acquisition signals are transmitted with an amplitude smaller than that of the information signals. At the receiving end, the acquisition signals are detected by correlation (11) and subsequent accumulation (12). This method maximizes the transmission capacity of the information signals. In addition, the acquisition time is reduced since adaptive contention-resolving techniques can be employed taking account of the estimated number of colliding terminals (2, 3, 4, 5).

20 Claims, 1 Drawing Sheet

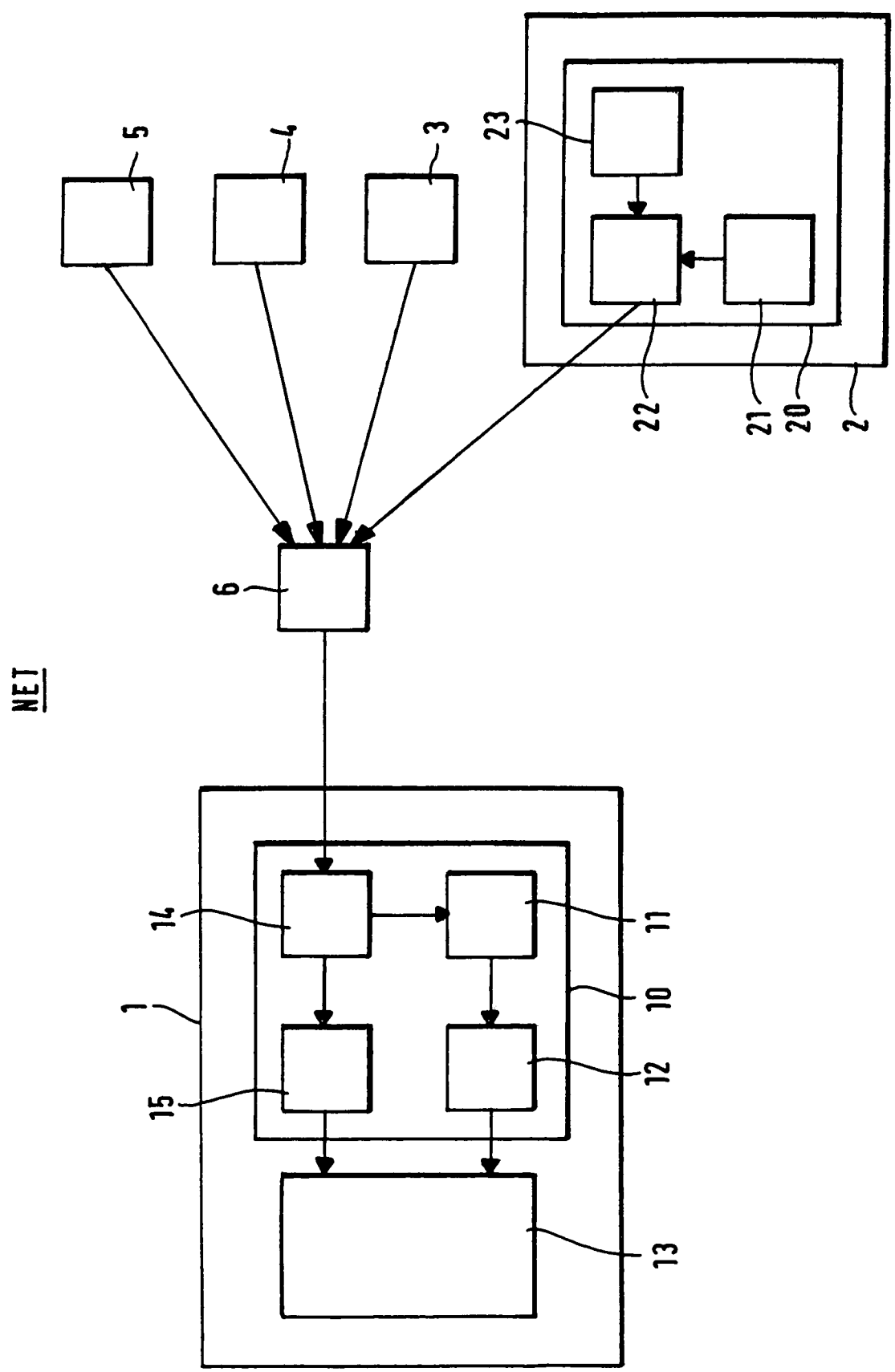

TRANSMITTING FACILITY AND RECEIVING FACILITY FOR A MULTIPOINT-TO-POINT SYNCHRONOUS CDMA NETWORK

BACKGROUND OF THE INVENTION

This invention relates to a transmitting facility and a receiving facility for a multipoint-to-point synchronous CDMA network, and to an acquisition method for a multipoint-to-point synchronous CDMA network.

Multipoint-to-point CDMA networks (CDMA=code division multiple access) are being used increasingly for the implementation of upstream channels in interactive communications networks. Interactive communications networks are designed as HFC (hybrid fiber/coax) or HFR (hybrid fiber/radio) networks, for example. For the downstream channel, use is made of a point-to-multipoint network that contains an optical feeder followed by a coaxial-cable or radio network. The upstream channel is increasingly implemented using a multipoint-to-point network, e.g., a CDMA network, which can be designed as an optical, electrical, or radio network or as a hybrid network.

In a synchronous CDMA network with a center and a plurality of terminals, the terminals must be locked in frequency and phase to the master clock of the center. The master clock is transmitted over the downstream channel to the terminals, in which frequency synchronization and phase synchronization with phase correction are implemented using a phase-locked loop (PLL) to generate their individual clock signals. To achieve synchronization, each of the terminals transmits an acquisition signal over the upstream channel of the multipoint-to-point CDMA network to the center.

WO 97/08861 discloses an acquisition method in which acquisition signals are sent to the center in CDMA-coded form. The upstream channel is divided into a first time range, which is reserved for the transfer of information signals, and a second time range, which is reserved for the transfer of acquisition signals. Accordingly, the second range is not available for information transfer, so that the existing transmission capacity is not optimally utilized.

SUMMARY OF THE INVENTION

It is therefore an object of the invention to provide an acquisition method which minimizes the influence of the acquisition procedure on the information transmission.

This object is attained by a transmitting facility for a multipoint-to-point synchronous CDMA network, comprising a unit for generating a CDMA-coded information signal, wherein a unit is provided for generating an acquisition signal, with encoding being performed using an acquisition code which is not a CDMA communication code, the signal level being telemetrically adjustable, and the acquisition signal being transmitted in the same transmission channel as the information signal.

The invention is further attained by a receiving facility for a multipoint-to-point synchronous CDMA network, comprising a unit for receiving and detecting a CDMA-coded information signal and a unit for receiving and detecting an acquisition signal, wherein the unit for receiving and detecting an acquisition signal comprises a logical correlator for correlating at least two serially transmitted, identical acquisition signals with an acquisition code which is not a CDMA communication code, and an accumulator for accumulating the correlated acquisition signals, by means of which the detection of the acquisition signal can be carried out, the acquisition signal being transmitted in the same transmission channel as the information signal.

Finally, the invention also resides in an acquisition method for a multipoint-to-point synchronous CDMA network comprising at least two terminals and a center, the terminals transmitting CDMA-coded information signals and acquisition signals to the center, wherein in order to achieve synchronization, each of the terminals transmits serially to the center at least two identical acquisition signals whose levels are telemetrically adjustable by the center and which are transmitted in the same transmission channel as the information signal, and wherein the center detects the acquisition signal by logically correlating the acquisition signal with an acquisition code which is not a CMDA communication code, and by subsequently accumulating the correlated acquisition signals.

Instead of interleaving information and acquisition signals in time, simultaneous transmission is proposed in which the acquisition signals are superimposed on the information signals. The acquisition signals are encoded in a specific acquisition code that differs from the CDMA communication code of the information signals. In addition, the acquisition signals are transmitted with an amplitude smaller than that of the information signals so as not to excessively interfere with the transmission of the information signals. At the receiving end, the acquisition signals are detected by correlation and subsequent accumulation. By this method, the transmission capacity for the information signals is maximized. There are no longer any time gaps/ranges in the upstream channel; the information signals can be transmitted continuously. Furthermore, the acquisition time is reduced since it is no longer necessary to wait for a time gap/range in which the transmission of the acquisition signals has to take place, but the acquisition signals can now be transmitted at any time. In addition, adaptive contention-resolving techniques can be used, taking account of the estimated number of colliding signals. Through the use of a specific acquisition code which is considerably shorter than the CDMA communication code, the hardware complexity for the detection of the acquisition signals is reduced.

Furthermore, the elimination of the need for the frame structure in the upstream channel, and thus for some circuit elements, such as a control unit etc., simplifies the implementation of the entire network. A structure advantageous for information transmission can be chosen.

The negative effect of the acquisition signals on the information signals can be minimized by controlling the signal levels, e.g., on-line, taking account of the actual signal-to-noise ratios.

Further advantageous features of the invention are defined in the dependent claims.

BRIEF DESCRIPTION OF THE DRAWINGS

One embodiment of the invention will now be explained with reference to the accompanying drawing, whose single FIGURE is a schematic block diagram of a multipoint-to-point CDMA network according to the invention.

DETAILED DESCRIPTION OF THE INVENTION

The multipoint-to-point CDMA network NET represents that portion of an interactive communications network which is used to implement the upstream channel. For the downstream channel of the interactive communications network, which serves to transmit broadband information, such as television signals, video signals, control signals, from a center to a plurality of terminals, no schematic representation is provided in order to simplify the illustration. The downstream channel can for instance be implemented with a hybrid network which, radiating from a center, interconnects the terminals via a distribution network consisting of fiber optic lines and optical splitters to form a point-to-multipoint network. Instead of optical lines, electric ones or a radio network or a hybrid type of network can be used. At the points of interconnection, optical network units (ONUs), broadband optical network terminations (BONTs), or base stations (BS) are used.

Instead of two separate networks for the downstream channel and the upstream channel, one and the same physical network can be used for both the downstream channel and the upstream channel. In that case, the network is implemented with optical lines, and different wavelengths are used for the downstream channel and the upstream channel.

The multipoint-to-point CDMA network NET thus represents one way to implement an upstream channel of an interactive communications network. It comprises a center 1 which in this embodiment is connected via a fiber optic line and an optical combiner 6 to four terminals 2, 3, 4, 5; in real networks, the center is connected to one thousand terminals, for example.

Center 1, also referred to as a "head end", includes a receiving facility 10 for receiving the information signals transmitted by terminals 2, 3, 4, 5, such as request signals for the transmission of videos ("video-on-demand") or Web pages from the Internet, and the acquisition signals transmitted by terminals 2, 3, 4, 5. Center 1 further includes a control unit 13, which processes the received signals. Control unit 13 is designed, for example, as a processor plus memory, register, etc. It has an interface to a transmitting unit (not shown) that transmits information signals in the downstream channel, and, if necessary, further interfaces, such as interfaces to a television station for gaining access to television signals, to an Internet service provider for gaining access to the Internet, to a video server for gaining access to videos.

Receiving facility 10 of center 1 is designed for a multipoint-to-point synchronous CDMA network NET, and consequently contains a unit 15 for receiving and detecting a CDMA-coded information signal and a unit 11, 12 for receiving and detecting an acquisition signal. Unit 11, 12 comprises a logic correlator 11 for correlating at least two serially transmitted, identical acquisition signals with an acquisition code that is not a CDMA communication code, and an accumulator 12 for accumulating the correlated acquisition signals. The level of each acquisition signal is adjusted telemetrically via center 1. Alternatively, center 1 specifies a maximum level that must not be exceeded, so that an indirect adjustment is made. For instance, center 1 adjusts the signal levels so that the sum level of all simultaneously transmitted acquisition signals is at least 10 dB lower than the sum level of all simultaneously transmitted information signals. To accomplish this, the center measures all signal levels received over the upstream channel and calculates optimized signal levels therefrom, which are transmitted over the downstream channel to the terminals. The measurement with subsequent transmission of the permitted signal level values takes place periodically in predetermined time slots, for example. The signal-to-noise ratio of the information signals received at center 1 must not be degraded by the acquisition signals, or such a degradation must be negligible. The acquisition signal is transmitted in the same channel as the information signal. Also provided is a unit 14. It contains, for example, an optical-to-electrical converter for converting the received optical signals to electrical signals for further electrical processing. If necessary, the electrical signals pass through an amplifier, a filter, an equalizer, etc. The signals so modified are then fed to unit 15 and unit 11, 12.

Terminals 2, 3, 4, 5 are commonly referred to as set-top units, set-top boxes, decoders, modems, ADSL modems, or XDSL modems. Each terminal 2, 3, 4, 5 contains a transmitting facility 20 for transmitting the information signals generated by it, such as request signals for the transmission of videos ("video-on-demand") or Web pages from the Internet, and the acquisition signals generated by it for login and acquisition at center 1. Each terminal 2, 3, 4, 5 further includes a control unit (not shown) for processing the signals received over the downstream channel. The control unit is designed, for example, as a processor plus memory, register, etc. It has, for example, an infrared interface for receiving request signals transmitted via a remote control and an interface to a television set and/or a computer for displaying the information received over the downstream channel.

Transmitting facility 20 of terminal 2 is designed for a multipoint-to-point synchronous CDMA network NET. Transmitting facility 20 contains a unit 23 for generating a CDMA-coded information signal and a unit 21 for generating an acquisition signal. The acquisition signal is encoded in an acquisition code that is not a CDMA communication code. The level of the acquisition signal is, as a rule, considerably, namely at least 10 dB, e.g., 20 dB, lower than the sum level of the information signals the active terminals 2, 3, 4, 5. The power of the acquisition signal can be dynamically varied, for instance adaptively in accordance with the number of simultaneously synchronizing terminals. The signal power is chosen so that the sum of the signal powers of all synchronizing terminals does not impair the information transmission. The acquisition signal may contain control signals, such as start of synchronization, number of signals to be transmitted, transmitted power, contention-resolving signals. The power of the acquisition signals to be transmitted can then be specified by center 1 telemetrically over the downstream channel. The acquisition signal is transmitted in the same channel as the information signal. Also provided is a unit 22. Unit 22 contains, for example, an electrical-to-optical converter for converting the electric information and acquisition signals to optical ones and for transmitting the optical signals over the fiber optic line. It may include a switch that prevents acquisition signals and information signals from being transmitted simultaneously. To achieve synchronization, exclusively acquisition signals are transmitted, and during information transmission, exclusively information signals are transmitted. Alternatively, a coupler is used instead of the switch.

The following describes an acquisition method for the multipoint-to-point synchronous CDMA network NET, which in this embodiment comprises four terminals 2, 3, 4, 5 and a center 1.

Terminals 2, 3, 4, 5 that have already synchronized transmit CDMA-coded information signals to center 1. The CDMA coding is performed using orthogonal codes. Each terminal 2, 3, 4, 5 is assigned one or more individual codes with which it encodes its information, i.e., data to be transmitted, prior to transmission. The CDMA code is, for example, an extended preferentially phased Gold code or a Walsh-Hadamard code, each with a length of 128 chips.

While some of the terminals, e.g., terminals 5 and 6, have already synchronized and are continuously transmitting information signals in a predetermined channel to center 1 using different CDMA communication codes, a still unsynchronized terminal, e.g., terminal 2, can synchronize at any time and simultaneously with the transmission of the information signals by generating an acquisition signal that it sends to center 1 several times in succession. The level of the acquisition signal is lower than that of the information signal being transmitted by a terminal. For instance, the sum of the levels of the acquisition signals of all synchronizing terminals is 20 dB lower than the sum of the levels of the information signals of all terminals transmitting user information. This ensures that the acquisition signals impair the information transmission only in a negligible manner.

The acquisition signal is transmitted in the same channel as the information signal. This eliminates the need for frames in which time ranges are provided for exclusive use by a particular transfer, but each terminal 2, 3, 4, 5 is free to send its acquisition signals at any time, parallel with simultaneously transmitted information signals of other terminals 2, 3, 4, 5.

At center 1, the received acquisition signal is detected by logical correlation 11 with an acquisition code which is not a CDMA communication code, and by subsequent accumulation 12 of the correlated acquisition signals.

The acquisition code is, for example, a Barker code with a length of 11 chips. The length of the acquisition code is thus shorter than the length of the CDMA communication code by at least a factor of 5. This simplifies the detection of the acquisition signals. In addition, the shorter code minimizes transmission impairments. An acquisition signal can be generated by simply transmitting the Barker code with a predetermined signal power, for example. Alternatively, the address of terminal 2, 3, 4, 5 can be modulated with the Barker code and then transmitted.

Accumulator 12 is designed, for example, as a register or integrator or the like.

Logical correlator 11 is designed, for example, as a matched filter that is tuned to the acquisition code, e.g., the Barker code.

If coherent detection is used, first correlation and then accumulation are performed. If quasi-coherent detection is used, the accumulation is followed by a squaring operation. If noncoherent detection is used, first correlation, then squaring, and finally accumulation are performed.

In a preferred embodiment of the invention, receiving facility 10 is characterized in that at least two logical correlators and at least two accumulators are provided for detecting at least two acquisition signals with different time relations to the information signals. Several logical correlators may be incorporated in a matched filter, but each correlator may also be designed as a separate matched filter. The additional use of different acquisition codes has the advantage that in the event of simultaneous acquisition, different terminals 2, 3, 4, 5 can be differentiated more quickly, so that the acquisition process speeds up.

After detection of the acquisition signal, independently of the number of acquisition codes used, a collision detection algorithm is started to detect simultaneous acquisition attempts by two or more terminals 2, 3, 4, 5. For this, two or more time-graded logical correlators are employed. Only when a single terminal 2, 3, 4, 5 has been isolated, for instance by a blocking signal transmitted in the downstream channel, to which terminals 2, 3, 4, 5 respond under control of a splitting algorithm, for example, will the subsequent synchronizing steps, such as identification, authentication, communication, etc., be performed.

The invention claimed is:

1. A transmitting facility for a multipoint-to-point synchronous CDMA network, comprising:
   a unit for generating a CDMA-encoded information signal,
   a unit for generating an acquisition signal and encoding the acquisition signal with an acquisition code having a substantially shorter length than a CDMA communication code used for encoding information signals, wherein the signal level of the acquisition signal is telemetrically adjustable, and
   a transmitter for transmitting, at least during an initial synchronization time, the information signal and the acquisition signal simultaneously in the same transmission channel.

2. The transmitting facility as claimed in claim 1, wherein the acquisition code is a Barker code.

3. The transmitting facility as claimed in claim 1, wherein the length of the acquisition code is shorter than the length of the CDMA communication code by at least a factor of five.

4. A receiving facility for a multipoint-to-point synchronous CDMA network, comprising:
   a unit for receiving and detecting a CDMA-encoded information signal and a unit for receiving and detecting an acquisition signal, wherein the unit for receiving and detecting an acquisition signal comprises a detector for detecting the acquisition signal with an acquisition code having a substantially shorter length than a CDMA communication code used for encoding information signals, and
   a logical correlator for correlating at least two serially transmitted, identical acquisition signals, and
   an accumulator for accumulating the correlated acquisition signals to detect the acquisition signal, wherein, at least during an initial synchronization time, the acquisition signal and the information signal are simultaneously transmitted in the same transmission channel.

5. The receiving facility as claimed in claim 4, wherein at least two logical correlators and at least two accumulators are provided for detecting at least two acquisition signals with different time relations to the information signals and/or for allowing the use of two or more acquisition codes.

6. The receiving facility as claimed in claim 5, wherein at least one matched filter serves to implement one or more correlators.

7. The receiving facility as claimed in claim 4, wherein at least one matched filter serves to implement one or more correlators.

8. The receiving facility as claimed in claim 4, wherein, prior to or after the accumulation, squaring is performed.

9. The receiving facility as claimed in claim 4, wherein the acquisition code is a Barker code.

10. The receiving facility as claimed in claim 4, wherein the length of the acquisition code is shorter than the length of the CDMA communication code by at least a factor of five.

11. An acquisition method for a multipoint-to-point synchronous CDMA network comprising at least two terminals and a center, the terminals transmitting CDMA-encoded information signals and acquisition signals to the center, wherein in order to achieve synchronization, each of the terminals serially transmits to the center at least two identical acquisition signals whose levels are telemetrically adjustable by the center and which are transmitted simultaneously with their respective information signals at least during an initial synchronization time in the same transmission channel, and said center detecting the acquisition signal with an acquisition code having a substantially shorter length than a CDMA communication code used for encoding information signals, logically correlating the detected acquisition signals and subsequently accumulating the correlated acquisition signals.

12. The method as claimed in claim 11, wherein the method further comprises:
   estimating the number of colliding terminals, and
   using a plurality of different contention-resolving techniques.

13. The method as claimed in claim 11, wherein the center telemetrically specifies the transmitted power of the acquisition signals of the terminals so the sum level of all simultaneously transmitted acquisition signals is at least 10 dB lower than the sum level of all simultaneously transmitted information signals.

14. The method as claimed in claim 11, wherein the acquisition code is a Barker code.

15. The method as claimed in claim 11, wherein the length of the acquisition code is shorter than the length of the CDMA communication code by at least a factor of five.

16. The method as claimed in claim 11, wherein, prior to or after the accumulation, squaring is performed.

17. A receiving facility for a multipoint-to-point synchronous CDMA network, comprising:
   a unit for receiving and detecting a CDMA-encoded information signal and a unit for receiving and detecting an acquisition signal, wherein the unit for receiving and detecting an acquisition signal comprises a detector for detecting the acquisition signal with an acquisition code having a substantially shorter length than a CDMA communication code used to encode information signals,
   a logical correlator for correlating at least two serially transmitted, identical acquisition signals, and
   an accumulator for accumulating the correlated acquisition signals to detect the acquisition signal, wherein, at least during an initial synchronization time, the acquisition signal and the information signal are simultaneously transmitted in the same transmission channel, and the signal level of the acquisition signal is telemetrically adjustable.

18. The receiving facility as claimed in claim 17, wherein the acquisition code is a Barker code.

19. The receiving facility as claimed in claim 17, wherein at least two logical correlators and at least two accumulators are provided for detecting at least two acquisition signals with different time relations to the information signals and/or for allowing the use of two or more acquisition codes.

20. The receiving facility as claimed in claim 17, wherein the length of the acquisition code is shorter than the length of the CDMA communication code by at least a factor of five.

* * * * *